Jan. 27, 1970 HIDEO SAWADA ET AL 3,491,957

COUPLING BETWEEN SPRING DRIVE AND CAMERA SPOOL

Filed June 12, 1968

INVENTOR
HIDEO SAWADA
FUMIHIRO MIYAGAWA
BY Burgess, Ryan & Hicks
ATTORNEY

United States Patent Office 3,491,957
Patented Jan. 27, 1970

3,491,957
COUPLING BETWEEN SPRING DRIVE AND CAMERA SPOOL
Hideo Sawada, Sagamihara-shi, and Fumihiro Miyagawa, Tokyo, Japan, assignors to Kabushiki Kaisha Ricoh, Tokyo, Japan, a corporation of Japan
Filed June 12, 1968, Ser. No. 736,455
Int. Cl. G03b 1/06
U.S. Cl. 242—71.5        7 Claims

ABSTRACT OF THE DISCLOSURE

An axially movable connecting rod is depressed by the camera user to disconnect the film take-up spool from a spring driven spring-shaft when the film is to be rewound. A spring loaded locking lever engages the connecting rod and keeps it depressed until the user turns a film winding knob after reloading the camera, when a cam mechanism disengages the locking lever and allows the connecting rod to move to an extended position in which it again connects the film take-up spool with the spring-shaft.

BACKGROUND OF THE INVENTION

The present invention relates to a device for connecting and disconnecting a film-winding spring with a take-up spool in an automatic film-winding camera, and more particularly, to a connecting and disconnecting device which holds the spring and spool in the disconnected position while the film is rewound.

In a camera wherein film is automatically wound onto a take-up spool from a casette by a spring, the winding spring must be disconnected from the take-up spool while the film is rewound into the casette.

In conventional cameras of this type, while the film is being rewound, a rewind knob must be kept manually depressed in order to disconnect said spring from the take-up spool. This requirement is troublesome and disadvantageous for the easy operation of such cameras.

SUMMARY OF THE INVENTION

According to the present invention, a step is cut on a rod which, when in a raised position connects the spring with the spool; and a locking lever is provided which engages with the step when the rod is manually moved to a depressed position, locking the rod in said depressed position. Since the rod when in the depressed position no longer connects the spring with the spool, these elements remains disconnected even when the finger is removed from the rewind knob, and easy rewinding of the film is possible.

The spring is re-connected with the spool when the film winding knob is turned, whereupon a cam-like projection moves said locking lever to disengage it from the step on the rod.

An object of the present invention is to connect and disconnect the film-winding spring with the take-up spool in an automatic film-winding camera by means of a very simple mechanism, and furthermore, to hold automatically these parts in the disconnected state while the film is being rewound.

Features of the invention will be better understood from the following description taken in connection with the accompanying drawings.

DESCRIPTION OF A PREFERRED EMBODIMENT

Figure 1:
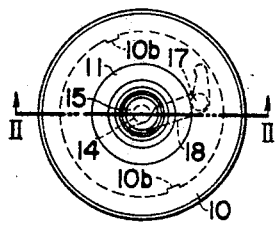
FIG. 1 shows a plan view of a spring winding device of an embodiment of the present invention.
Figure 2:
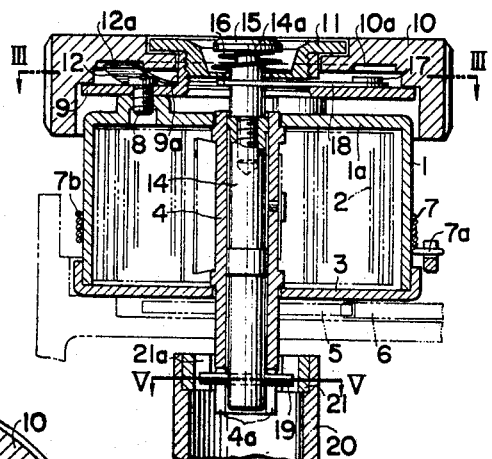
FIG. 2 shows a cross section taken on cutting plane II—II of FIG. 1.

A spring box 1 is shown with a spiral drive spring 2 installed therein and a bottom cover 3 fitted thereto. The outer end of the drive spring 2 and the inner end thereof are respectively fixed to a top-plate 1a of said spring-box 1 and a tubular spring-shaft 4 which is supported in the center of the bottom cover 3 in a freely rotatable condition. A gear 5 is fixed to the spring-shaft 4 and another gear 6 engaged with said gear 5 is further connected to the shutter mechanism, the governor of which prevents an excessively quick winding of the film, and to an automatic stepping film winder which stops the winding action after one frame has been advanced. The latter mechanisms are not shown in the drawings.

One end 7a of a coil spring 7 (which is wound on the outer surface of said spring box 1) is fixed to an appropriate portion of the camera body, while another end 7b of the coil spring 7 is left free. This arrangement allows only a clockwise rotation of the spring box 1 relative to the camera body as viewed in FIG. 1. The spring box 1 is supported on the camera body by an appropriate structure which is not shown in the drawings and which allows free rotation of the spring box.

Figure 3:
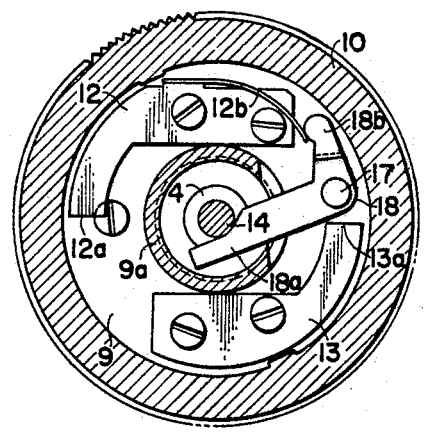
FIG. 3 shows a cross section taken on cutting plane III—III of FG. 2.

A film winding knob 10, with a knurled finish on its outer cylindrical surface, is loosely fit to cylindrical portion 9a of a disc 9 fixed on the top plate 1a of the spring box 1 with a flat fillister head screw 8. A retaining ring 11 is tightly screwed onto the top of cylindrical portion 9a and prevents the loss of winding knob 10 from the cylindrical portion 9a. Saw-toothed notches 10a, which engage with leaf springs 12 and 13 mounted on said disc 9 (refer to FIG. 3), are cut on the inner surface of the winding knob 10 forming a ratchet ring. The ends 12a and 13a of the leaf springs 12 and 13 act as pawls engaging the notches 10a, so that rotation of the winding knob in a clockwise direction as seen in FIG. 1, rotates the spring box 1 in the same direction, but counterclockwise rotation thereof is not transmitted to the spring box 1. A rewind button 15 is fitted on a connecting rod 14, which is loosely journaled in the spring-shaft 4, and projects out from the camera. A spring 16 which is compressed between the rewind button 15 and the retaining ring 11 drives the connecting rod 14 outward. A locking lever 18 is supported rotatably around a headed pivot pin 17 on the disc 9. The locking lever is given a clockwise rotation around the rod 14 (as seen in FIG. 3) by the elastic force of a leaf spring 12b (which is integrated with the leaf spring 12), thereby urging the inner edge of arm 18a of the locking lever 18 against the surface of the connecting rod 14.

The connecting rod 14 and the spring-shaft 4 are connected for rotary motion by a radially extending pin 19 fixed near the lower end of the connecting rod 14, which pin engages longitudinal notches 4a on the spring-shaft 4. Both ends of the pin 19 are also loosely engaged with notches 21a on the end plate 21 which is fixed on one end of the spool 20. Therefore, when the spring shaft 4 rotates in the aforesaid condition, the spool 20 is driven to rotate through the medium of the pin 19, and the film is wound up. When the rewind button 15 is depressed against the elastic force of the spring 16, the inner edge of the locking lever 18 moves inward over the step 14a which forms a circumferential groove on the connecting rod 14 (refer to FIG. 4) to block upward motion of the connecting rod 14, and the pin 19 moves downward out of notch 21a of the end plate 21, thereby allowing free rotation of the spool relative to the spring-shaft and rewinding of the film.

Figure 4:
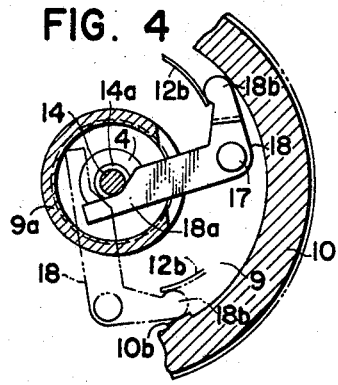
FIG. 4 shows a partial cross section taken on cutting plane III—III of FIG. 2 showing in solid lines the locking lever engaged with the rod, and, in dashed lines, the same locking lever disconnected from the rod.
Figure 5:
FIG. 5 shows a cross section on cutting plane V—V of FIG. 2.

By turning the winding knob 10 in a reciprocating motion, the disc 9 which is integrated with the spring box 1 intermittently rotates in a clockwise direction as seen in FIG. 4. When the disc 9 has rotated to some extent, the shorter arm 18b of the crank 18 is moved radially inward (as shown with a dash-dot line in FIG. 4) by one of the cam surfaces or projections 10b on the inner wall of the winding knob 10, and the locking arm slightly rotates counterclockwise around the pivot pin 17 thereby disengaging the crank 18 from the step 14a of the connecting rod 14. If the pin 19 is in a coincident position with the notch 21a, the disengagement of the locking lever 18 from the step 14a allows the pin 19 to move upward and interlock with the notch 21a. However, if the relative position of the pin 19 and the notch 21a is not in coincidence, the pin 19 does not interlock with the notch 21a but is supported on the edge of the end plate 21. Even if the pin 19 does not engage with the notch 21a at the start, their positions will coincide and they will automatically engage together, when the film is to be wound and the spring-shaft rotates.

The following is claimed:

1. A device for connecting and disconnecting a film take-up spool to a spring drive comprising:
   (a) a hollow spring-shaft rotatable in a winding direction by a spring drive;
   (b) a connecting rod movable in an axial direction within the spring-shaft between a first position and a second position;
   (c) operating means for allowing the user of the camera to move the connecting rod from the first position to the second position preparatory to rewinding film from the take-up spool;
   (d) clutch means for connecting the spring-shaft to the take-up spool when the connecting rod is in the first position and for allowing relative rotation of the spring-shaft and the take-up spool when the connecting rod is in the second position.

2. The device of claim 1 wherein the clutch means comprises a radially extending projection on the connecting rod engageable with surfaces defining an axially extending slot in the spring-shaft and with surfaces defining an axially extending slot in the take-up spool.

3. The device of claim 2, wherein the operating means comprises a button accessible from the outside of the camera mounted on the connecting rod, said button being manually movable with the connecting rod between extended position when the connecting rod is in the first position and a depressed position when the connecting rod is in the second position, and resilient means for biasing the connecting rod into the first position.

4. The device of claim 1 comprising:
   (e) a reciprocally rotatable winding knob;
   (f) means for connecting said winding knob to the spring drive during rotation of the winding knob in a first direction to transmit a winding torque to the spring drive;
   (g) locking means engageable for holding the connecting rod in the second position, said locking means automatically engaging when the connecting rod is moved into said second position;
   (h) unlocking means automatically operable when the winding knob is rotated for disengaging the locking means and allowing the connecting rod to move from the second to the first position.

5. The device of claim 4 wherein the locking means comprises a locking lever biased against the connecting rod by a spring, and surfaces defining a circumferential groove in the connetcing rod placed to receive the locking elver when the connecting rod is in the second position whereby said locking lever will hold the connecting rod in said second position; and the unlocking means comprising a cam surface on the winding knob placed to contact the locking lever upon rotation of the winding knob and to move the locking rod out of the circumferential groove and a spring exerting force against the connecting rod tending to move said connecting rod from the second to the first position upon motion of the locking lever out of the circumferential groove.

6. A roll film camera film transport mechanisms comprising:
   (a) a film spool rotatable in a winding direction and an unwinding direction;
   (b) an end plate on the spool;
   (c) a hollow spring-shaft mounted axially of the spool and having a lower end extending through an aperture in the end plate;
   (d) a reciprocally rotatable winding knob mounted axially of the spring-shaft;
   (e) a rotatable spring box mounted axially of the spring-shaft;
   (f) means for restricting rotation of the spring box to rotation in the winding direction;
   (g) a spiral spring extending between the spring box and the spring-shaft adapted to transmit a torque from the spring box to the spring-shaft in the winding diretcion;
   (h) a ratchet mechanism connecting the winding knob and the spring box for rotation in the winding direction;
   (i) a connecting rod mounted for axial movement within the hollow spring-shaft between an extended and a depressed position;
   (j) spring means biasing the connecting rod into the extended position;
   (k) an upper end on the connecting rod extending externally of the camera and adapted to be moved by the camera user from extended to the depressed position in preparation for a film rewinding operation;
   (l) surface defining a radially extending spool in the end plate of the spool;
   (m) surfaces defining a radially extending spring-shaft slot in the spring-shaft;
   (n) a pin extending radially from the connecting rod at its lower end, said pin extending through the spring-shaft slot into the spool slot when the connecting rod is in the extended position and said pin clearing the spool slot when the connecting rod is in the depressed position, whereby the spring-shaft and the spool are connected for rotation when the connecting shaft is in the extended position but not in the depressed position;
   (o) a pivot pin fixed with respect to the spring box and extending in a direction parallel to the axis of the spring-shaft;
   (p) a locking lever mounted for rotation about the pivot pin;
   (q) a locking arm on the locking lever having an inner edge;
   (r) spring means resiliently urging the inner edge of the locking arm toward the axis of the connecting rod and against the side of the connecting rod at a locking position fixed with respect to the spring box;
   (s) surfaces defining a circumferential groove in the connecting rods, said groove being opposite the locking position when the connecting rod is in the depressed position and said groove being adapted to receive the inner edge of the locking arm, whereby the locking arm may hold the connecting rod in said depressed position;
   (t) a cam follower potrion of the locking lever; and
   (u) a cam surface on the film winding knob placed to contact and move the cam follower portion of the locking lever when the locking arm is in the circumferential groove as said film winding knob is rotated, such movement rotating the locking lever about the pivot pin and withdrawing said locking lever from the circumferential groove, whereby the connecting rod is allowed to return from the depressed to the extended position.

7. A device for connecting and disconnecting a spring-shaft to a spool in a camera comprising a spring box, a winding knob which rotates reciprocally to rotate said spring box in one direction and to wind a film-winding-spring, a connecting rod adapted to transmit rotary motion from the spring-shaft to the spool when in a raised position, said connecting rod being furnished with surfaces defining a step on it, said connecting rod being loosely inserted in and rotatable with a spring-shaft and having one end thereof exposed outside the camera, a locking lever supported rotatably on said spring box with one end of said locking lever biased against the surface of said connecting rod by a spring and engageable with the step of the connecting rod, and a projection situated on an inner wall of the winding knob adapted to disengage the locking lever from the connecting rod, whereby when the connecting rod is depressed engagement of the locking lever with the step of the connecting rod is made and the rotary coupling of the connecting rod with the spool is released; and whereby reciprocating movement of the winding knob disengages the locking lever from the step of the connecting rod, so that said connecting rod is released, thereby restoring the connecting rod to the initial position thereof.

References Cited

UNITED STATES PATENTS

| 1,201,002 | 10/1916 | Treadaway et al. | 242—71.5 |
| 1,946,855 | 2/1934 | Horns | 242—71.5 |

FOREIGN PATENTS 619,221 9/1935 Germany.

NATHAN L. MINTZ, Primary Examiner